(12) United States Patent
Knowles et al.

(10) Patent No.: US 8,041,633 B2
(45) Date of Patent: Oct. 18, 2011

(54) SYSTEM AND METHOD OF ELECTRONIC DATA TRANSACTION PROCESSING

(75) Inventors: W. Jeffrey Knowles, Provo, UT (US); Russell Hales Day, Provo, UT (US); David J. Matthews, Lindon, UT (US); Jeffrey R. Burke, Orem, UT (US); Scott E. Wessman, Provo, UT (US); A. Carlo Okolowitz, Orem, UT (US); Joseph B. Emig, Orem, UT (US)

(73) Assignee: Mtrex, Inc., Orem, UT (US)

( * ) Notice: Subject to any disclaimer, the term of this patent is extended or adjusted under 35 U.S.C. 154(b) by 1650 days.

(21) Appl. No.: 10/370,676

(22) Filed: Feb. 21, 2003

(65) Prior Publication Data
US 2004/0167851 A1    Aug. 26, 2004

(51) Int. Cl.
*G06Q 40/00* (2006.01)
(52) U.S. Cl. ............... 705/39; 705/40; 705/41
(58) Field of Classification Search ........... 705/39–42, 705/35, 37, 38; 709/240
See application file for complete search history.

(56) References Cited

U.S. PATENT DOCUMENTS

| | | |
|---|---|---|
| 5,781,908 A | 7/1998 | Williams et al. |
| 5,878,215 A * | 3/1999 | Kling et al. ............. 709/207 |
| 5,920,847 A | 7/1999 | Kolling et al. |
| 5,945,653 A | 8/1999 | Walker et al. |
| RE36,365 E | 11/1999 | Levine et al. |
| 5,987,140 A | 11/1999 | Rowney et al. |
| 5,987,498 A | 11/1999 | Athing et al. |
| 5,991,738 A | 11/1999 | Ogram |
| 6,006,205 A | 12/1999 | Loeb et al. |
| 6,135,349 A | 10/2000 | Zirkel |
| 6,205,433 B1 | 3/2001 | Boesch et al. |
| RE37,122 E | 4/2001 | Levine et al. |
| 6,212,512 B1 | 4/2001 | Barney et al. |
| 6,269,345 B1 | 7/2001 | Riboud |
| 6,327,348 B1 | 12/2001 | Walker et al. |
| 6,332,160 B1 | 12/2001 | Tabuchi |
| 6,343,279 B1 | 1/2002 | Bissonette et al. |
| 6,349,351 B1 | 2/2002 | Shimizu et al. |
| 6,360,209 B1 | 3/2002 | Loeb et al. |
| 6,374,367 B1 | 4/2002 | Dean et al. |
| 6,390,366 B1 | 5/2002 | Heidenreich et al. |
| 6,401,126 B1 | 6/2002 | Douceur et al. |
| 6,430,593 B1 | 8/2002 | Lindsley |
| 6,477,510 B1 | 11/2002 | Johnson |
| 6,513,070 B1 * | 1/2003 | Kozlowski et al. ......... 719/310 |
| 6,640,214 B1 | 10/2003 | Nambudiri et al. |
| 6,975,937 B1 | 12/2005 | Kantarjiev et al. |
| 6,996,538 B2 | 2/2006 | Lucas |
| 7,240,027 B2 | 7/2007 | McConnell et al. |
| 2002/0174031 A1 * | 11/2002 | Weiss ........................... 705/26 |

* cited by examiner

*Primary Examiner* — Hani M Kazimi
(74) *Attorney, Agent, or Firm* — Patent Law Group; Robert D. Aktins

(57) ABSTRACT

A transaction process system (10) provides for data transactions between parties. In a credit card transaction, the parties are the merchant (20), acquiring bank (24), card association (34), issuing bank (14), and cardholder (12). A transaction processing center (30) is positioned between the acquiring bank and the card association. The transaction processing center provides data processing channels for message-based processing (72) and filed-based processing (76). The file-based processing uses an incoming queue (80) and outgoing queue (84) to simplify the interface. The transaction processing center also provides for currency conversions and account reconciliation on a per transaction basis. The transaction processing center uses a scheduler (160) to efficiently manage the data processing resources.

18 Claims, 9 Drawing Sheets

SYSTEM AND METHOD OF ELECTRONIC DATA TRANSACTION PROCESSING

CROSS REFERENCE TO RELATED PATENT APPLICATIONS

The present patent application is related to copending U.S. patent application Ser. No. 10/370,677, entitled "Method of Scheduling and Event Processing in Computer Operating System" and filed concurrently herewith by W. Jeffrey Knowles et al. The present patent application is further related to copending U.S. patent application Ser. No. 10/370,681, entitled "System and Method of Currency Conversion in Financial Transaction Process" and filed concurrently herewith by W. Jeffrey Knowles et al. The present patent application is further related to copending U.S. patent application Ser. No. 10/370,673, entitled "System and Method of Transferring Data Through Transaction Process" and filed concurrently herewith by W. Jeffrey Knowles et al.

FIELD OF THE INVENTION

The present invention relates, in general, to data transaction processing and, more particularly, to system and method of electronically processing data transactions.

BACKGROUND OF THE INVENTION

An integral part of many financial transactions involves purchase of goods and services by credit card or other electronic transfer of funds. Consumers use credit cards to purchase goods and services from merchants and service providers. Businesses and government agencies use electronic fund transfers to acquire goods and services and issue credit cards to employees as necessary to conduct business. Credit cards are a convenient, safe, effective, and integral part of the economy.

There are typically three financial institutions involved in credit card transactions: card association, issuing bank, and acquiring bank. Well known card associations operate under the names of Visa and MasterCard. The issuing bank issues a credit card to a cardholder. The credit card will include a credit line that will impose certain limits on the cardholder's ability to make purchases. The cardholder agrees to pay the amount due on the credit card statement, or minimum portion thereof with interest on the balance, to the issuing bank. The merchant has an account or relationship with the acquiring bank to initiate credit card transactions and ultimately receive payment for the transaction. The card association operates between the acquiring bank and issuing bank to coordinate and simplify the large number of transactions occurring on a daily basis.

A credit card transaction usually starts at the point of sale where the cardholder has selected merchandise or service which he or she wishes to purchase. The merchant or service provider enters the credit card number by swiping the card through a terminal to read information stored on the magnetic strip or enters the credit card number directly into the terminal keypad. The terminal is connected to a communication network which electronically links the merchant to the acquiring bank or processing center. The acquiring bank is electronically linked to the card association and the card association is electronically linked to the issuing bank.

Most credit card transactions are a two-part process. In the first part, while the cardholder is interacting with the merchant at the point of sale, a purchase authorization request is forwarded via an electronic communication network through the acquiring bank and card association to the issuing bank. The purchase authorization includes the merchant identification, amount of the purchase, and cardholder information. The cardholder information may include name, address, primary account number, PIN number, fraud protection data, etc. The purchase authorization checks with the issuing bank to see that the cardholder is in good-standing with the bank, that the purchase is within his or her approved credit limit, and that there are no other irregularities. The issuing bank approves the transaction for the requested amount and routes the approval back through the card association and acquiring bank to the merchant. Even though no money changes hands, the cardholder and merchant complete their interaction. The cardholder leaves the store with the merchandise in hand and the merchant receives assurance that the money will be paid.

In the second part of the process, an aggregation of the individual purchase authorizations is processed through the credit card system to fund authorized transactions in a process known as clearing and settlement. During clearing and settlement, monies are transferred between accounts to complete specific pre-approved transactions. Transferring money, sometimes in different currencies, can be a time consuming, expensive, and error prone process. The aggregation of purchases and payment of net proceeds to the parties during clearing and settlement is a more efficient and cost effective alternative to exchanging money during each transaction. Clearing and settlement may occur at the end of the day, or at regular intervals during the day, or every few days depending on the volume of transactions and needs of the parties. However, the acquiring and issuing banks often do not have the resolution of the individual transactions to resolve discrepancies when reconciling the aggregation of transactions. If unable to balance the clearing and settlement, the banks are often forced to absorb the discrepancies based on the allocation of risk and may end up loosing money on certain transactions as part of the cost of doing business.

A principal function of the card association is to act as a funding clearing house for the clearing and settlement process. An issuing bank may need to pay monies to a large number of acquiring banks and an acquiring bank may expect to receiving monies from a large number of issuing banks. By operating through the card association, the issuing bank makes one wire transfer to the card association to make payments to specific acquiring banks. Likewise, the acquiring bank receives one wire transfer from the card association to settle transactions for specific issuing banks. The card association receives funds and allocates funds to its individual members in order to clear and settle pending and approved credit card transactions.

If the acquiring bank and issuing bank are based in different countries and operate with different native currencies, then the transfer of funds often requires one or more currency conversions. The acquiring bank generally leaves the currency conversions to the card association but in doing so the acquiring bank looses control and any benefit the conversion might yield to itself and to its customer, the merchant. In the present competitive marketplace, giving up control of currency conversions involved in credit card transactions can be harmful to one's market share and profit margins. The customers of the acquiring bank (merchants) will demand the best rates and service or they will switch to someone who can deliver.

In actual business practice, there can be variations and exceptions to the above described process. For example, the acquiring bank and the issuing bank may be one in the same and card association may be left out of the transaction processes. Moreover, the acquiring bank and issuing bank often contract out one or more of the above support functions to third party processors or service providers. The processors operate and function on behalf of the bank to complete the transaction for the merchant and cardholder. The third party processors bring hardware and software expertise that can help the acquiring bank and issuing bank operate more efficiently, with lower costs, and fewer errors.

DETAILED DESCRIPTION OF THE DRAWINGS

Figure 1:
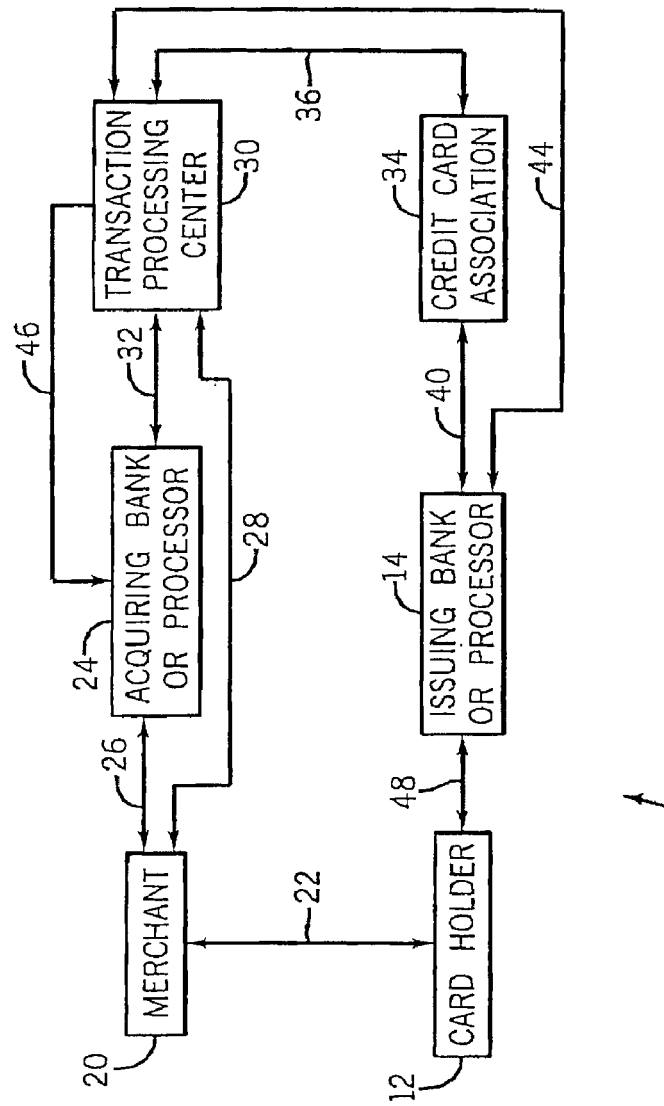
FIG. 1 is a block diagram of an electronic data transaction processing system.

A transaction processing system 10 is shown in FIG. 1. Transaction processing system 10 is applicable to many types of electronic transactions, including financial, reservations, and any other transaction involving the transfer of data. In the present discussion, transaction processing system 10 will be described in terms of a credit card transaction between a cardholder and a merchant and will include the financial institution(s) operating between these parties.

Transaction processing system 10 is used in many financial transactions involving purchase of goods and services by credit card or other electronic transfer of funds. Consumers use credit cards to purchase goods and services from merchants and service providers. Businesses and government agencies use electronic fund transfers to acquire goods and services and issue credit cards to employees as necessary to conduct business.

Transaction processing system 10 is a computer-based communication and transaction processing network with electronic links between parts of the system. Each of the communication links described herein can be direct hard-wired lines, leased high bandwidth lines, telephone lines, fiber optic cable, wireless, satellite, or the like.

Transaction processing system 10 includes a relationship between cardholder 12 and issuing bank 14. Cardholder 12 can be an individual, corporation, or other legal entity that establishes a line of credit with issuing bank 14 based on their credit rating and credit risk. Issuing bank 14 issues a credit card or other credit instrument to cardholder 12. Cardholder 12 has the ability to purchase goods and services and otherwise pay debts using the credit card, within the limits imposed by issuing bank 14. Issuing bank 14 assumes responsibility to make good on any charge or debt properly incurred by cardholder 12 within established credit limits. Cardholder 12 agrees to pay the amount due on the credit card statement, or minimum portion thereof with interest on the balance, to issuing bank 14.

With credit card in hand, cardholder 12 can conduct business and make purchases with most business entities. For example, cardholder 12 can enter the place of business of merchant 20 and purchase goods or services with the credit card. Alternately, cardholder 12 may make purchases over the telephone or on-line via merchant 20's internet website. FIG. 1 illustrates the interactive commercial relationship between cardholder 12 and merchant 20 by link 22.

Cardholder 12 makes his or her purchase selection(s) and provides the credit card to merchant 20. Merchant 20 swipes the credit card through a terminal to read the information stored on the magnetic strip, or enters the credit card number into the terminal keypad, or calls-in the credit card number by telephone into a processing center. The merchant's terminal is connected to acquiring bank 24 by electronic communication link 26.

Merchant 20 has an account or relationship with acquiring bank 24. A transaction between cardholder 12 and merchant 20 involves the transmission of data from merchant 20 to acquiring bank 24 by way of communication link 26. The transaction data includes (1) identification and other information related to cardholder 12 as read from the magnetic strip on the back of the credit card, (2) identification and other information related to merchant 20, and (3) the amount of the purchase or transaction. The cardholder information may include name, address, primary account number, PIN number, fraud protection data, etc. The transmission of data is encrypted to prevent fraud and unauthorized access to sensitive and confidential information related to cardholder 12 and merchant 20.

Acquiring bank 24 processes the transaction by making a record in its computer database, and possibly re-formatting the data or adding additional information according to its own procedures. Acquiring bank 24 may use a third party processor for some or all of its transaction processing functions. In the present example, the transaction is routed to transaction processing center 30 over communication link 32. In other applications, merchant 20 may have a direct relationship with transaction processing center 30 as shown by communication link 28.

Transaction processing center 30 is a third party service provider that acts for or on behalf of acquiring bank 24 or merchant 20 as an interface to credit card association 34. The role and function of transaction processing center 30 will be further discussed below. Transaction processing center 30 processes the transaction and routes the processed transaction over communication link 36 to card association 34. Card association 34 includes well-known institutions identified by names such as Visa and MasterCard. Card association 34 operates between acquiring bank 24 and issuing bank 14 to coordinate and simplify the large number of credit card transactions occurring on a daily basis.

Card association 34 routes the transaction to issuing bank 14 over communication link 40. FIG. 1 assumes that the similar activities and operation of a transaction processing center like 30 are incorporated within issuing bank 14. In an alternate embodiment, a third party transaction processing center can be positioned between issuing bank 14 and card association 34 to provide some or all of the features described for transaction processing center 30.

Issuing bank 14 has primary authority and assumes the principal risk of approving and settling the transaction. Issuing bank 14 processes the transaction and routes the response back through communication link 40 to card association 34. Card association 34 routes the response from issuing bank 14 back through communication link 36 to transaction processing center 30, which in turn communicates the issuing bank's response back to acquiring bank 24 by communication link 32. Merchant 20 receives the issuing bank's response to the transaction from acquiring bank 24 by communication link 26.

As mentioned, there are variations to the above process. By way of example, in certain situations and with certain arrangements, transaction processing center 30 may communicate directly with issuing bank 14 as shown by communication link 44. Transaction processing center 30 may receive a transaction generated by merchant 20 and respond back to acquiring bank 24 by communication link 46 or directly back to merchant 20 by communication link 28. In communicating directly with merchant 20, transaction processing center 30 may assume part or all of the authority and have procedures in place to accept the risk and responsibility for approving and processing the credit card transaction. In addition, third party service providers can operate at many points along the transaction processing route. Nonetheless, even given these and other variations on a central theme, in most cases, the basic credit card transaction process remains as described above.

As an illustration of transaction processing system 10, assume credit card transaction A is defined as cardholder 12 being an individual and citizen from the United Kingdom (UK) traveling in the United States (US) on business and making a purchase from a merchant in a US city. Issuing bank 14 is a UK national bank and acquiring bank 24 is a US national bank. Transaction processing center 30 is a third party service provider with communication links to acquiring bank 24 and card association 34 as described above. Card association 34 sits between issuing bank 14 and transaction processing center 30. Transaction processing center 30 operates on behalf of acquiring bank 24 and merchant 20 as an interface to card association 34.

In credit card transaction A, cardholder 12 enters the place of business of merchant 20 with credit card in hand to purchase goods or services. Cardholder 12 makes his or her purchase selection(s) and provides the credit card to merchant 20. Merchant 20 swipes the credit card through a terminal to read the information stored on the magnetic strip. At this point in the process, where cardholder 12 is directly interacting with merchant 20, the transaction is a purchase authorization request. The purchase authorization checks to see that the cardholder is in good-standing with the bank, that the purchase is within his or her approved credit limit, and that there are no other irregularities. No monies change hands or accounts between cardholder 12 and merchant 20 at the point of sale. Instead, merchant 20 is simply requesting authorization for the amount of the purchase. Often times, merchant 20 does not know, understand, or even care who or what is approving the authorization. Merchant 20 just wants the purchase authorization to come back fast and be approved. The obligation and reputation of the financial entity identified on the credit card or other entity who assumes the risk of the transaction gives merchant 20 confidence that payment is in fact forthcoming.

The purchase authorization request includes (1) identification and other information related to cardholder 12 as read from the magnetic strip on the back of the credit card, (2) identification and other information related to merchant 20, and (3) the amount of the purchase or transaction. The cardholder information may include name, address, primary account number, PIN number, fraud protection data, etc. The purchase authorization request is encrypted to prevent fraud and unauthorized access to sensitive and confidential information related to cardholder 12 and merchant 20.

The purchase authorization request is routed across communication link 26 to acquiring bank 24. Acquiring bank 24 processes the request by making a record in its computer database, and possibly re-formatting the authorization request or adding additional information according to its own procedures. The purchase authorization request is routed to transaction processing center 30 over communication link 32. Transaction processing system 30 routes the purchase authorization request over communication link 36 to card association 34. Card association 34 forwards the purchase authorization request to issuing bank 14 by communication link 40. Issuing bank 14 then approves or denies the purchase authorization for the requested amount and routes the approval or denial back through card association 34, transaction processing center 30, and acquiring bank 24 to merchant 20 in the reverse order previously described. If the purchase authorization is approved, cardholder 12 and merchant 20 complete their transaction. Cardholder 12 leaves the store with the merchandise and a record of the transaction and merchant 20 receives assurance that the money will be paid. If the purchase authorization request is denied, cardholder 12 can offer another form of payment or forego the purchase.

The authorizing institution is typically issuing bank 14, although acquiring bank 24 or transaction processing center 30 may assume that role in certain circumstances and under certain arrangements in which it chooses to bear the responsibility and risk of the credit card transaction. For example, transaction processing center 30 may respond directly to the authorization request back to acquiring bank 24 over communication link 46. Acquiring bank 24 would then notify merchant 20. Alternately, the purchase authorization request from merchant 20 may go directly to transaction processing center 30 by communication link 28 for approval. Transaction processing center 30 would approve or deny the purchase authorization request and send the approval or denial back to merchant 20 over communication link 28.

Clearing and settlement is another type of transaction that can be processed through transaction processing system 10. The transfer and exchange of money, sometimes in different currencies, can be a time consuming, expensive, and error prone process. The aggregation of purchases and payment of net proceeds to the parties during clearing and settlement is a more efficient and cost effective alternative to exchanging money for each transaction. Clearing and settlement may occur at the end of the day, or at regular intervals during the day, or once every few days depending on the volume of transactions and needs of the parties.

In clearing and settlement, monies actually exchange hands by electronic transfer between accounts to complete previously approved but as of yet unsettled transactions. A number of purchase authorization requests like transaction A are approved throughout the day or other periods of time as determined by merchant 20 or acquiring bank 24. During clearing and settlement, an aggregation of the individual purchase requests is processed through transaction processing system 10 to fund previously approved transactions.

Merchant 20 initiates a clearing and settlement transaction in many cases at the end of the business day. The clearing and settlement transaction includes and represents specific credit card transactions, including transaction A, which have been approved and accrued since the last clearing and settlement transaction. The clearing and settlement transaction is routed from merchant 20 to acquiring bank 24 by communication link 26. If merchant 20 is a large institution, or if merchant 20 has special arrangements with acquiring bank 24, then acquiring bank 24 may forward the single clearing and settlement transaction for merchant 20 to transaction processing center 30. Alternatively, acquiring bank 24 may accumulate a number of clearing and settlement transactions from smaller merchants before forwarding an aggregate clearing and settlement transaction to transaction processing center 30.

Transaction processing center 30 processes the clearing and settlement transaction and forwards the processed transaction to card association 34. Card association 34 accumulates clearing and settlement transactions from a number of sources, e.g. other acquiring banks or other transaction processing centers, which are intended for each issuing bank. The clearing and settlement transaction from merchant 20 intended to clear and settle transaction A, along with other transactions from merchant 20 and from other merchants and from other acquiring banks, each intended for issuing bank 14, are accumulated, sorted, processed, and routed to issuing bank 14 by card association 34.

Issuing bank 14 reviews the aggregate clearing and settlement transaction from card association 34 and, if all is in order with the pre-approved authorization requests, executes a wire transfer of funds, or authorizes deduction from accounts established within card association 34, for payment of the specific approved transactions made during the clearing and settlement period with merchants that have transacted with cardholders using credit cards issued by issuing bank 14. In other words, the funds paid by issuing bank 14 will be sufficient to cover payments which card association 34 must make to specific acquiring banks to cover monies due to merchants for authorized purchases made by cardholders using credit cards issued by issuing bank 14. Issuing bank 14 sends credit card statements on a periodic basis, e.g. monthly, to its cardholders for the purchases made during the period as shown by link 48. Issuing bank 14 assumes the risk whether the cardholder will pay the bill. Issuing bank 14 earns its revenue from fees and interest charges received from cardholders on any unpaid balance due on the statements.

The issuing banks belonging to card association 34 make payment thereto to clear and settle specific pre-approved outstanding transactions. Card association 34 then makes payments to specific acquiring banks with the funds received from the issuing banks. One of those payments from card association 34 will go through transaction processing center 30 to acquiring bank 24. Acquiring bank 24 then credits the account of merchant 20 for transaction A. That is, a portion of the payment made by card association 34 to acquiring bank 24 by way of transaction processing center 30 will be used to pay merchant 20 for transaction A.

A principal function of card association 34 is to act as a funding clearing house for clearing and settlement. Issuing bank 14 may need to pay monies to a large number of acquiring banks, and acquiring bank 24 may expect to receive monies from a large number of issuing banks. By operating through card association 34, issuing bank 14 makes one wire transfer or authorization to debit its account to card association 34 who in turn makes payments to specific acquiring banks. Likewise, acquiring bank 24 receives one wire transfer from card association 34 to settlement transactions for specific issuing banks.

Yet another type of transaction that can be processed through transaction processing center 30 is a purchase authorization request which automatically triggers clearing and settlement at the end of the day or other time interval without any further post authorization transaction. Transaction processing center 30 can be set up to keep track of each purchase authorization request, which will include clearing and settlement data. At a predetermined interval, transaction processing center 30 will automatically generate a process to clear and settle some or all of the outstanding purchase authorization requests. The automatic clearing and settlement can also be initiated in or by card association 34.

The activities and operation of transaction processing center 30 will now be discussed in further detail. As shown in FIG. 1, transaction processing center 30 is positioned between acquiring bank 24 and card association 34. Transaction processing center 30 uses direct electronic communication links with acquiring bank 24 and card association 34, and in some applications directly with merchant 20 and issuing bank 14. Transaction processing center 30 can be a third party service provider as shown in FIG. 1 operating on behalf of and providing services for acquiring bank 24, or the activities and operation of transaction processing center 30 can be incorporated within acquiring bank 24 or even merchant 20.

Transaction processing system 10 has been and will be described in terms of a credit card transaction for the purpose of illustration. Transaction processing system 10 is also applicable to any type of transaction involving the transfer and processing of data. For example, transaction processing system 10 could be utilized in airline, hotel, rental car, and ticketing reservation systems. Transaction processing system 10 has applications in manufacturing and supply chain management.

Figure 2:
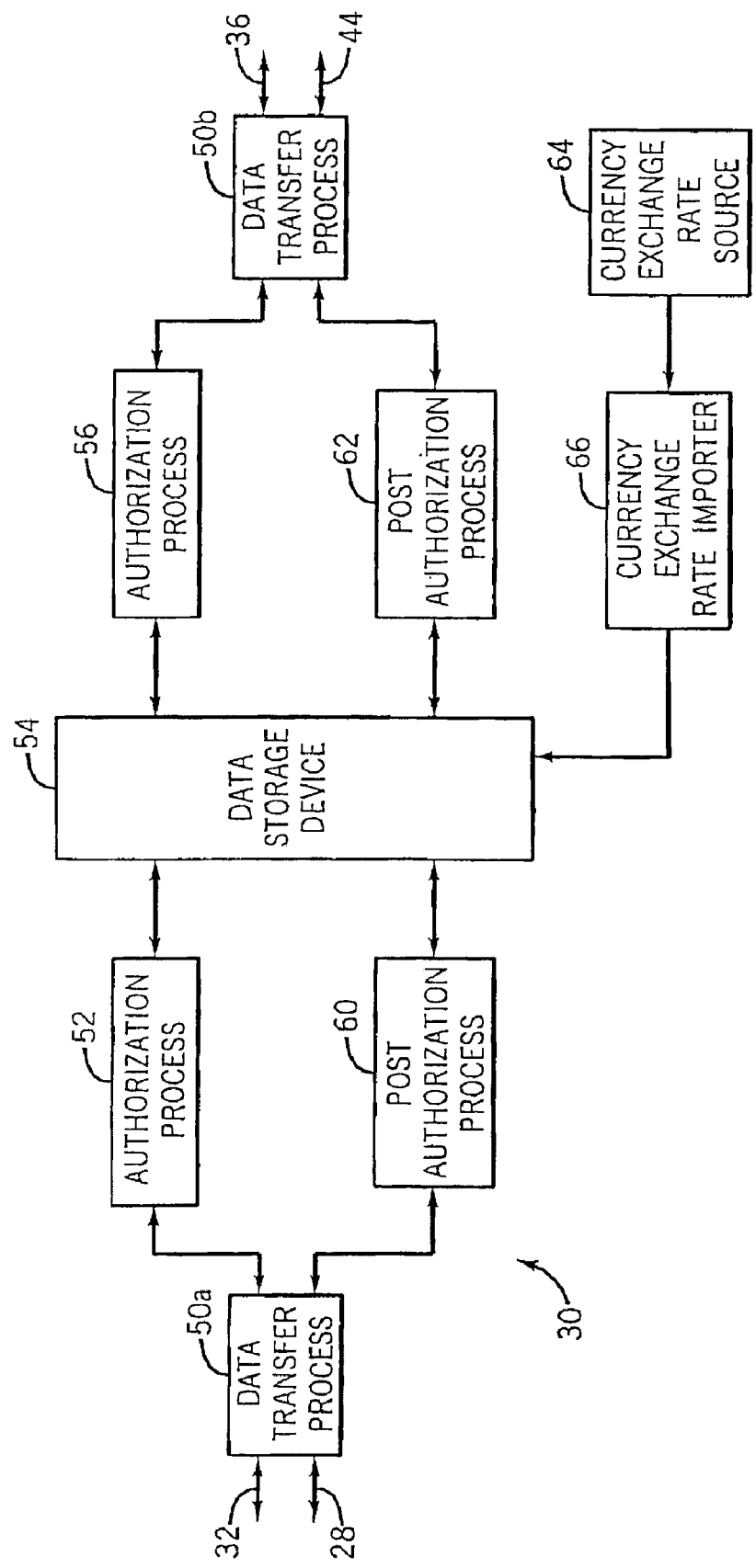
FIG. 2 is a block diagram of the transaction processing center of FIG. 1.

Turning to FIG. 2, transaction processing center 30 is shown to include two data processing channels. A first data processing channel is intended for message-based transactions, such as purchase authorization requests and other messages where time and speed are of the essence. Authorization process 52, data storage device 54 and authorization process 56 are shown as exemplary data processing functions in the first data processing channel. It is understood that other data processing functions could be implemented in the first data processing channel. A second data processing channel is intended for file-based transactions, such as clearing and settlement and reports. Post authorization process 60, data storage device 54 and post authorization process 62 are shown as exemplary data processing functions in the second data processing channel. It is understood that other data processing functions could be implemented in the second data processing channel. The first and second data processing channels each provide a number of data processing functions, such currency conversions in any one of a plurality of selectable currencies.

Transaction processing center 30 further includes data transfer process 50 having a first portion and a second portion. A transaction or other data from acquiring bank 24 (or from merchant 20) is received on communication link 32 (or communication link 28) and processed through the first portion of data transfer process 50 labeled as 50a. Data transfer process 50a separates message-based transactions, such as purchase authorization requests, from file-based transactions, such clearing and settlement and reports, for processing in their respective data processing channels through transaction processing center 30.

A transaction determined to be a purchase authorization request is routed from data transfer process 50a through a purchase authorization channel including authorization process 52, data storage device 54, and authorization process 56. Authorization process 52 performs parsing and formatting of the purchase authorization request for local storage in data storage device 54. Authorization process 52 may also perform other data processing functions such as currency conversion, reporting, error checking, and other administrative functions on the purchase authorization request. The purchase authorization request is stored in data storage device 54 for reporting, account reconciliation, and general record keeping and transaction visibility. Data storage device 54 is a high capacity relational database utilizing a mass storage medium such as a hard disk drive, optical drive, or the like. The purchase authorization request is then routed through authorization process 56 where the request is formatted and any additional information added to the authorization request as necessary for transfer to card association 34. The second portion of data transfer process 50 labeled as 50*b* sends the properly formatted purchase authorization request to card association 34 by way of communication link 36. Data transfer process 50*b* may send the properly formatted purchase authorization request directly to issuing bank 14 by way of communication link 44.

The reverse process holds true for responses from issuing bank 14 to the purchase authorization request. The response from issuing bank 14 is forwarded by card association 34 to transaction processing center 30. A transaction determined to be a response to a purchase authorization request is routed from data transfer process 50*b* through the purchase authorization channel. Authorization process 56 performs parsing, formatting, currency conversion, reporting, error checking, and other administrative functions for the response to the purchase authorization request prior to local storage in data storage device 54. The response to the purchase authorization request is stored in data storage device 54 for reporting, account reconciliation, and general record keeping and transaction visibility. The response to the purchase authorization request is then routed through authorization process 52 where the request is formatted and any additional information added to the response for transfer to acquiring bank 24 or merchant 20. Data transfer process 50*a* sends the properly formatted response to the purchase authorization request to acquiring bank 24 or merchant 20.

The aforedescribed purchase authorization channel through transaction processing center 30 is a dedicated communication link that is always open and active to provide for fast processing of purchase authorization requests. In a practical, real-time system, the purchase authorization request sent by merchant 20 must (1) traverse acquiring bank 24, transaction processing center 30, and card association 34 to issuing bank 14, (2) be approved or denied by issuing bank 14, and (3) be sent back through card association 34, transaction processing center 30, and acquiring bank 24 to merchant 20, all within a matter of seconds to meet the expectations of cardholder 12 and merchant 20. If the purchase authorization request is perceived to be excessively time consuming, cardholder 12 and merchant 20 may become discouraged from using a credit card for the purchase of goods and services. Thus, a quick purchase authorization request approval time is important to the success of transaction processing system 10. If the authorization process takes too long, cardholder 12 could become reluctant to using the convenience and safety of a credit card. Merchant 20 could lose sales from buyers who are inclined to make purchases with a credit card. The issuing bank and acquiring bank could lose interest and fees derived from each credit card transaction.

As previously discussed, transaction processing center 30 also processes clearing and settlement transactions for acquiring bank 24 and merchant 20. The clearing and settlement transaction is procedural different than the purchase authorization request and therefore is shown with its own processing channel. Whereas the purchase authorization process is a real-time, message-based transaction with speed of the essence, the clearing and settlement transaction is typically a file-based transaction processed as a batch file of multiple transactions where time is not a critical factor.

Data transfer process 50 separates message-based transactions, such as purchase authorization requests, from file-based transactions, such clearing and settlement, for processing in their respective data processing channels through transaction processing center 30. Data transfer process 50 may examine different attributes or features to determine whether a transaction is message-based or file-based. For example, message-based transactions have structural and formatting differences from file-based transaction. In other situations, the method or mode of receipt of the transaction will indicate whether it is message-based or file-based.

A transaction determined by data transfer process 50*a* to be a clearing and settlement process is routed through a file-based data processing channel including post authorization process 60, data storage device 54, and post authorization process 62. Post authorization process 60 performs parsing and formatting of the clearing and settlement transaction for local storage in data storage device 54. Post authorization process 60 may also perform other functions such as currency conversion, reporting, error checking, and other administrative functions on the clearing and settlement transaction. The clearing and settlement transaction is stored in data storage device 54 for reporting, account reconciliation, and general record keeping and transaction visibility. The clearing and settlement transaction is then routed through post authorization process 62 where the request is formatted and any additional information added to the transaction as necessary for transfer to card association 34. Data transfer process 50*b* sends the properly formatted clearing and settlement transaction to card association 34 by way of communication link 36. Data transfer process 50*b* may send the properly formatted clearing and settlement transaction directly to issuing bank 14 by way of communication link 44.

The reverse process holds true for responses from issuing bank 14 to the clearing and settlement transaction. The response from issuing bank 14 to the clearing and settlement transaction may be a wire transfer of funds or authorization for card association 34 to debit the issuing bank's account and forward funds to transaction processing center 30. The funds are in turn sent to acquiring bank 24 to credit the account of merchant 20 for purchases made by cardholder 12. Any transaction determined by data transfer process 50*b* to be a response to a clearing and settlement transaction is routed from data transfer process 50*b* to post authorization process 62. Post authorization process 62 performs parsing, formatting, currency conversion, reporting, error checking, and other administrative functions for the response to the clearing and settlement transaction prior to local storage in data storage device 54. The response to the clearing and settlement transaction is stored in data storage device 54 for reporting, account reconciliation, and general record keeping and transaction visibility. The response to the clearing and settlement transaction is then routed through post authorization process 60 where the response is formatted and any additional information added to the response for transfer to acquiring bank 24 and finally to merchant 20. Data transfer process 50*a* sends the properly formatted response to the clearing and settlement transaction to acquiring bank 24 or merchant 20.

Transaction processing center 30 is shown in FIG. 2 to include authorization processes 52 and 56 for processing purchase authorization requests as one type of message-based transaction and post authorization processes 60 and 62 for processing clearing and settlement as one type of file-based transaction. Authorization processes 52 and 56 are readily expandable to handle other types of data processing functions for other message-based transactions. Likewise, post authorization processes 60 and 62 are readily expandable to handle other types of data processing functions for other file-based transactions.

Acquiring bank 24, issuing bank 14, and card association 34 may send administrative transactions back and forth through transaction processing center 30. The administrative transactions include reports, account reconciliation, refunds, charge-backs, inquiries, error messages, and other administrative functions. A transaction determined by data transfer process 50*a* to be an administrative transaction can be routed to either authorization process 52 or to post authorization process 60 depending on whether the administrative transaction is message-based or file-based. If the administrative transaction is file-based, post authorization process 60, operating in its expanded role, performs parsing and formatting of the administrative transaction for local storage in data storage device 54. The administrative transaction is stored in data storage device 54 for reporting, account reconciliation, and general record keeping and transaction visibility.

In some cases, the administrative transaction is processed and sent back to the initiator. For one example, merchant 20 may request a report of transactions incurred over some period of time which is generated by transaction processing center 30 from the data stored in data storage device 54. The report is then sent back to merchant 20. In another example of a message-based transaction which is processed through authorization processes 52 and 56, operating in their expanded role, acquiring bank 24 may request a current quote on currency exchange rates being applied by transaction processing center 30. Again, the quote is generated and returned to acquiring bank 24.

Other times the administrative transaction must be forwarded to card association 34. For example, cardholder 12 may return the merchandise and merchant 20 must process a refund. In another example, acquiring bank 24 may detect an error during account reconciliation and request a correction by card association 34. In such cases, the administrative transaction is then routed through post authorization process 62 (or, if message-based, through authorization process 56) where the request is formatted and any additional information added to the transaction as necessary for transfer to card association 34. Data transfer process 50*b* sends the properly formatted administrative transaction to card association 34 by way of communication link 36. In some cases, card association 34 will handle the administrative transaction and, in other cases, card association 34 will forward the transaction to issuing bank 14. Data transfer process 50*b* may send the properly formatted administrative transaction directly to issuing bank 14 by way of communication link 44.

The reverse process holds true for responses from card association 34 or issuing bank 14 to the administrative transaction. Any transaction determined by data transfer process 50*b* to be a response to an administrative transaction is routed from data transfer process 50*b* to post authorization process 62 (or authorization process 56). Post authorization process 62 performs parsing, formatting, reporting, error checking, and other administrative functions for the response to the administrative transaction prior to local storage in data storage device 54. The response to the administrative transaction is stored in data storage device 54 for reporting, account reconciliation, and general record keeping and transaction visibility. The response to the administrative transaction is then routed through post authorization process 60 (or authorization process 52) where the response is formatted and any additional information added to the response for transfer to acquiring bank 24 and finally to merchant 20. Data transfer process 50*a* sends the properly formatted response to the administrative transaction to acquiring bank 24 or merchant 20.

Figure 3:
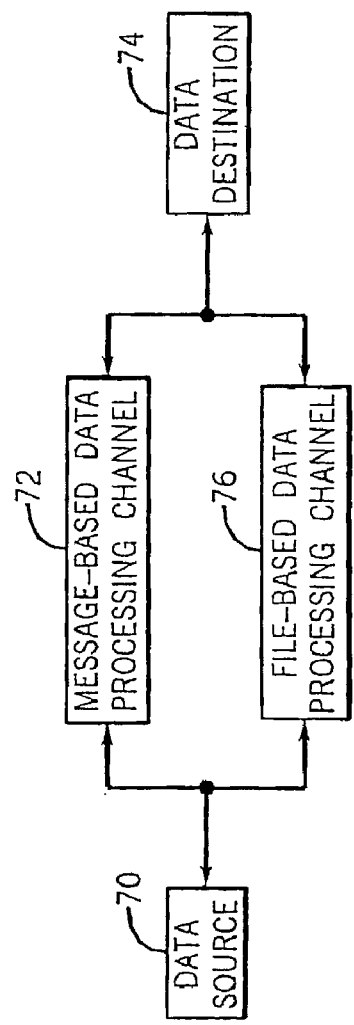
FIG. 3 is a block diagram illustrating the operation of the transaction processing center.

A simplified representation of transaction processing center 30, including data transfer process 50*a* and 50*b* (collectively referred to as data transfer process 50), is shown in FIG. 3. Data source 70 represents the incoming transactions and data from acquiring bank 24 or merchant 20. For a message-based transaction, the type of message or contents of the message or the mode of receipt determines the data processing path through transaction processing center 30. For example, a purchase authorization request is a type of message that, because of its need for speedy processing, is handled by data transfer process 50 and transaction processing center 30 in a time critical manner. Message-based data, such as the purchase authorization request, is routed directly through the message-based data processing channel 72 of transaction processing center 30. In the case of the purchase authorization request, the message-based data processing is immediately routed through the open and active processing channel comprising authorization processes 52 and 56 and data storage device 54. The purchase authorization request information is rapidly processed within transaction processing center 30, including any necessary parsing, formatting, currency conversion, reporting, error checking, data storage, and other administrative functions.

Another example of message-based data processing is one that is controlled by the contents of the message such as a high priority request for currency exchange rates. Since exchange rates may change rapidly in real-time, it is important to get a quick response to have the most up-to-date and accurate information.

Message-based data processing channel 72 will rout the data being processed to data destination 74 which may be card association 34 or issuing bank 14. Alternatively, data destination 74 can be acquiring bank 24 or merchant 20 if the message-based data processing is intended to return to the initiator.

Another feature of data transfer process 50 is shown as file-based data processing channel 76. If the data received from data source 70 is a file, then information contained in or attributes associated with the file determine the processing path for the data in the file. For example, the file may contain a field that includes a file number. The file number will determine how the data in the file is to be processed through transaction processing center 30. Alternatively, the file may contain a status field which will determine how the data in the file is to be processed through transaction processing center 30. Other attributes of the file such as its file name or file extension or type of file or date of creation or owner of the file or size of the file can be used to determine how the data in the file is to be processed through transaction processing center 30. As further explained in FIG. 5 and associated text, file-based data processing channel 76 receives a file from data source 70 and uses the file contents or attributes to determine how the data in the file is to be processed through transaction processing center 30. The processed data is routed to data destination 74.

The block diagram shown in FIG. 3 also applies to the reverse path through transaction processing center 30. In this case, data source 50 represents card association 34 or issuing bank 14 and data destination 74 represents acquiring bank 24 or merchant 20. Message-based data transfers are processed and routed through message-based data processing channel 72 of transaction processing center 30 based on the type or contents of the message. File-based data transfers are processed and routed through file-based data processing channel 76 of transaction processing center 30 based on the contents or attributes of the file.

Figure 4:
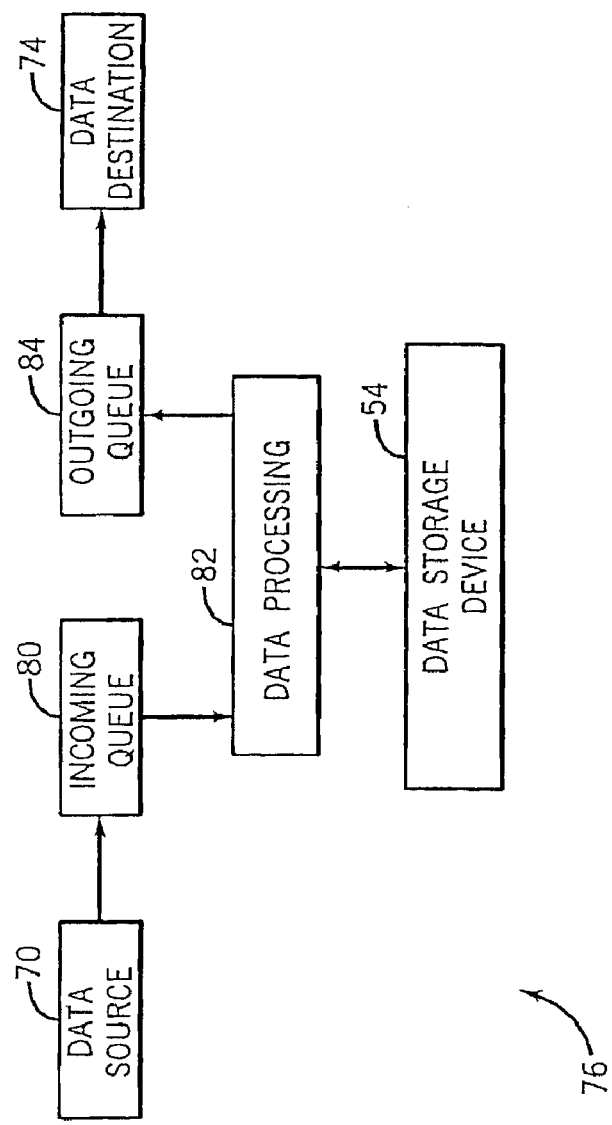
FIG. 4 is a block diagram illustrating the data processing with the incoming queue and outgoing queue.

File-based data processing channel 76 is shown in FIG. 4. Data source 70 and data destination 74 operate as described for FIG. 3. Files from data source 70 are placed in incoming queue 80. The files can be placed in incoming queue by data source 70 loading the files into the queue when available or by transaction processing center 30 checking the acquiring bank's server on a regular basis for transaction files available over a file transfer protocol (FTP) connection.

Incoming queue 80 contains a register or stack that can accommodate any size file, within the data storage capacity of transaction processing center 30. Incoming queue 80 will contain one or more variable length files with associated start and stop locations for each file. Incoming queue 80 will not necessarily know or understand the contents of the files. Each record or location in incoming queue 80 will be a file. The files can be different sizes and types. A file can contain many different data formats and have many specific functions. Some files may be formatted according to one of the Visa file formats and then transferred across communication link 32 or 28 over an FTP connection. Other files may be formatted according to one of the MasterCard file formats and then transferred across communication link 32 or 28 over a secure socket layer (SSL) connection. A file can be an aggregation of clearing and settlement transactions from acquiring bank 24 from many different merchants. A clearing and settlement transaction file will contain one or more individual transactions from one or more merchants. Each clearing and settlement transaction may contain credit card number and other information related to the cardholder, identity and information related to the merchant, and the amount of the transaction. A file can contain a request for a report by acquiring bank 24 or merchant 20. A file can also contain account reconciliation requests or error corrections or refund transactions or administrative functions.

Data processing 82 represents one or more computer systems each with one or more central processing units (CPUs) and each operating software to control access to incoming queue 80. Each CPU can be operating a different process. Data processing 82 may be one or more servers local to transaction processing center 30 or it may be distributed to multiple computer systems with communication links to remote locations. Data processing 82 sends and receives data from data storage device 54. The software operating on the one or more CPUs of data processing 82 will examine incoming queue 80 and retrieve files for processing based on the contents of the file or attributes of the file. For example, a first CPU in data processing 82 may query incoming queue 80 looking for files or groups of files containing a certain file number or status. Files with file number 100 may be clearing and settlement transactions which the first CPU will process accordingly. A second CPU in data processing 82 may query incoming queue 80 looking for files or groups of files having certain file extensions or creation dates or other file attributes. Files with a file extension of say ".REQ" may be a request for a report. The second CPU processes the request for report and forwards the report to the requester.

The CPUs of data processing 82 may be dedicated to processing certain types of files or they may share responsibilities. The CPUs of data processing 82 which are idle, i.e. no primary files to process, can be temporarily re-assigned to processing other types of files on a secondary basis until some primary files need to be processed. Alternately, a prioritization scheme can be established such that each CPU in data processing 82 in turn takes the next file or group of files from incoming queue 80 based on the hierarchy of the prioritization scheme. The CPUs will be fully utilized, each backing up the other for maximum data throughput.

Data processing 82 processes the data with each file according to its procedures and the contents of the file. In the above example of a clearing and settlement transaction file, data processing 82 parses the data, perform currency conversions and error checking, adds information, reformats data as necessary, and performs other administrative functions. Data processing 82 will access data storage device 54 as necessary to perform the data processing function. A process in data processing 82 will then place the processed clearing and settlement transaction data file in outgoing queue 84. In a similar manner for the report request file, data processing 82 parses the data, retrieves data from data storage device 54, performs error checking, adds information, reformats data as necessary, and performs other administrative functions. Data processing 82 then places the processed report file in outgoing queue 84.

The files in outgoing queue 84 may be transferred to data destination 74 in a variety of ways. Transaction processing center 30 may send the files by way of one of its communication links to data destination 74. Alternatively, data destination 74 may initiate the transfer after receiving a notice of "file ready for transfer" instruction from transaction processing center 30. Data destination 74 may poll or query outgoing queue 84 at predetermined times or after a given time since the original request file was placed in incoming queue 80. In other embodiments, incoming queue 80 may physically reside at data source 70 and outgoing queue 84 may physically reside at data destination 74. In this case, data processing 82 would access the files stored in incoming queue 80 on data source 70's server. Data processing 82 then places processed files in outgoing queue 84 on data destination 74's server.

Figure 5:
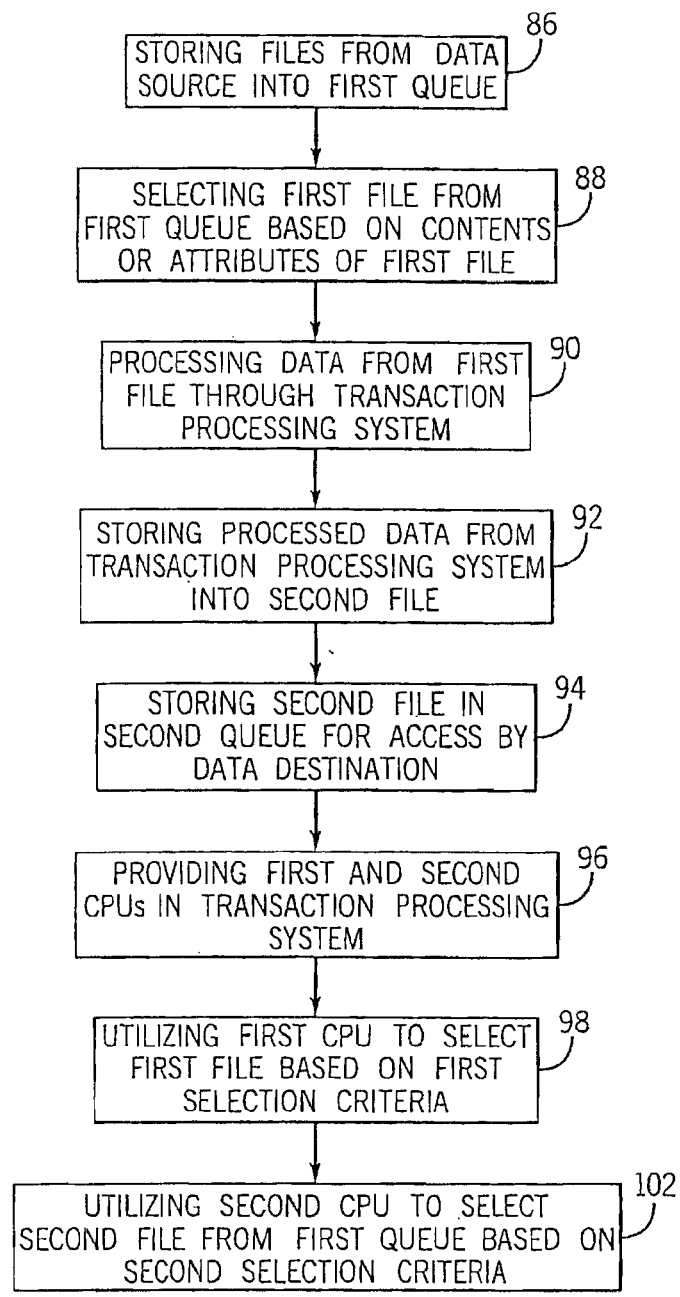
FIG. 5 is a flowchart of the operation of data processing function in FIG. 4.

FIG. 5 illustrates the steps involved in the operation of file-based data processing channel 76. Step 86 stores files from data source 70 in incoming queue 80. Step 88 selects a file from incoming queue 80 based on the contents or attributes of the file. Step 90 processes data from the file through data processing 82. Step 92 stores the processed data from data processing 82 in an outgoing file. Step 94 stores the outgoing file in outgoing queue 84 for access by data destination 74. Step 96 provides first and second CPUs in data processing 82. Step 98 utilizes the first CPU to select the file from incoming queue 80 based on a first selection criteria. The first selection criteria may involve selecting files or groups of files containing a certain file number or status or other contents of the file. Step 102 utilizes the second CPU to select the file to be placed into outgoing queue 84 based on a second selection criteria. The second selection criteria may involve selecting files or groups of files based on file name extension or other file attribute.

The operation of file-based data processing channel 76 simplifies the data processing through transaction processing center 30. Incoming queue 80 allows many types of files to be received and made available for processing without knowledge of the complexity, structure, or function associated with each type of file. Data processing 82 can operate with multiple CPUs. Each CPU can be operating the same software which is configurable to query and access files in incoming queue 80 according to many file processing protocols, e.g. dedicated file processing responsibilities, or hierarchical processing based on some prioritization scheme, or any other file processing ordering. Therefore, the structural and functional knowledge associated with incoming queue 80 is minimal. Data source 70 need not be concerned with interfacing with data processing 82. Data source 70 need only place a data file in incoming queue 80. Incoming queue 80 may know it has one or more files stored in its stack, but has no idea of the contents, structure, or function of the files. The CPUs of data processing 82 need not be concerned with interfacing with a number of requesters and data sources. The CPUs interface only with incoming queue 80. The CPUs simply query incoming queue 80 and access the file or group of files based on predefined file processing protocols.

Likewise, outgoing queue 84 allows many types of files to be received and made available for processing without knowledge of the complexity, structure, or function associated with each type of file. Each CPU can be operating the same software which is configurable to place processed files in outgoing queue 84 according to many file processing protocols, e.g. hierarchical processing based on some prioritization scheme or any other file process ordering. Therefore, the structural and functional knowledge associated with outgoing queue 84 is minimal. Data destination 74 need not be concerned with interfacing with data processing 82. Data destination 74 need only extract a data file from outgoing queue 84. Outgoing queue 84 may know that one or more files are stored in its stack, but has no idea of the contents, structure, or function of the files. The CPUs of data processing 82 need not be concerned with interfacing with a number of data destinations. The CPUs interface only with outgoing queue 84. The CPUs simply places processed files or groups of files into outgoing queue 84 for access by data destination 74 based on predefined file processing protocols.

Transaction processing center 30 provides significant flexibility as to where resources are placed and who requests information and receives data. The incoming queue and outgoing queue simplify the interface and processing for data processing 82 as well as for data source 70 and data destination 74.

The previous examples have discussed several types of data processing functions that are performed within transaction processing center 30. One of the data processing steps that is performed for purchase authorization requests and for clearing and settlement transaction within both data processing channels of transaction processing center 30 is currency conversion. It is an obvious fact that cardholder 12 and merchant 20 must deal in a world economy. There are many countries and many different currencies throughout the world. The simple transaction A previously discussed involves at least two countries, i.e. US and UK, and their respective currencies. Transaction processing center 30 provides flexibility as to how, when and by what exchange rate one currency is converted to another currency, and to whom fees are accessed for the currency conversion.

Transaction processing center 30 receives timely currency exchange rates from the financial markets. Currency exchange rate source 64 in FIG. 2 represents one or more sources from the financial markets that set or monitor currency exchange rates. The most current exchange rates are sent to currency exchange rate importer 66 which parses and formats the currency exchange rates for local storage in data storage device 54. The current exchange rates stored in data storage device 54 are used for currency conversion as described hereinafter.

Figure 6:
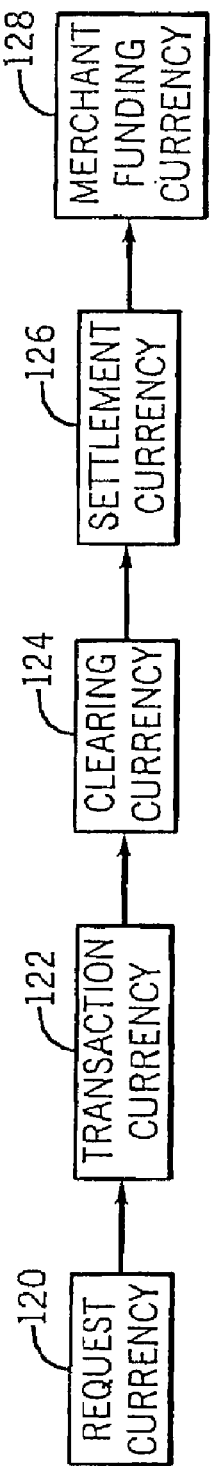
FIG. 6 is a block diagram of the plurality of currencies used by the transaction processing center.

FIG. 6 illustrates a basic block diagram of the logical flow of the transaction with a number of currency conversions. Associated with the entities defined in FIG. 1 there are default settings which collectively are used in determining currency conversions. Transaction processing center 30 records these settings in its system for use in the currency conversion process and assessment of fees associated therewith. Merchant 20 has settings such as the default merchant funding currency which define the currency in which he or she would like to be paid and the default request currency which is the currency of the merchandise price quote, i.e. the amount of money that the merchant is expecting to receive. Acquiring bank 24 has settings such as acceptable exchange rates. Card association 34 has a number of settings and rules by which it operates. Issuing bank 14 has settings such as mark-up and mark-down for the monetary values of the transactions.

Returning to the exemplary transaction A, when merchant 20 submits the purchase authorization request directly, or through acquiring bank 24, to transaction processing center 30 there is a request currency 120 associated with the purchase amount. Request currency 120 can be any currency denomination selectable by the merchant. Merchant 20 expects to be paid a certain price or amount of money for the merchandise or service being purchased by cardholder 12. Merchant 20 selects request currency 120, or allows cardholder 12 to select request currency 120, as the stated currency for the price or amount of money that the merchant is expecting to receive. In transaction A, given that merchant 20 is a US-based business operating with a US acquiring bank 24, merchant 20's settings are most likely and assumed to be United States Dollars (USD) for request currency 120.

Since request currency 120 can be any currency denomination from any country, a transaction currency 122 is provided and used as a baseline currency for account reconciliation, generating statements, making refunds, reporting functions, funding merchant 20, or processing through card association 34 and issuer 14. Many financial institutions prefer to deal in certain well-established and stable currencies. Certain less stable currencies are difficult and problematic to reconcile and report against. Transaction currency 122 provides a basis, using a well-established currency as a baseline, to make adjustments following account reconciliation and provide useful reporting functions. For transaction A with a US-based acquiring bank 24, transaction currency 122 is USD. Therefore, since request currency 120 can be any currency denomination, transaction currency 122 is a useful step to allow for the flexibility in selecting the request currency while providing a vehicle to convert the request currency to one of the more established and accepted transaction currencies for reporting and reconciliation. If necessary, transaction processing center 30 performs a currency conversion from request currency 120 to transaction currency 122. Transaction processing center 30 may mark-up or mark-down on the monetary value of the transaction or otherwise access a fee for the currency conversion from request currency 120 to transaction currency 122 based on the system settings. Since request currency 120 is USD and transaction currency 122 is USD, there is no need for a currency conversion.

At this point in the process, the purchase authorization request for transaction A exists in transaction processing center 30 in the form of transaction currency 122. Transaction processing center 30 will be able to store and process data, generate reports, reconcile the accounts, and perform further administrative processing based on transaction currency 122 independent of the form of request currency 120.

Transaction processing center 30 also provides clearing currency 124 which is selectable in accordance with settings and the desires of merchant 20 and acquiring bank 24. Recall from the previous explanation that card association 34 operates as an intermediary between acquiring bank 24 and issuing bank 14. Card association 34 will interact with issuing bank 14 in the currency defined by the bank identification number (BIN) set up by issuing bank 14 with card association 34. For the purposes of transaction A, assume the UK-based issuing bank 14 interacts with card association 34 in its native currency, Great Britain Pounds Sterling (GBP).

If transaction processing center 30 were to send the purchase authorization request to card association 34 in the form of the transaction currency, i.e. in USDs, then card association 34 would perform a currency conversion to GBP and access cardholder 12 a fee for the conversion to the benefit of itself and/or issuing bank 14. Transaction processing center 30, and acquiring bank 24 and merchant 20, would have little if any control over the currency conversion made by card association 34. Card association 34 would profit from any fees and proceeds of exchange rates, including any mark-up or mark-down in the monetary value of the transaction, involved in the currency conversion from USD to GBP. Alternately, issuing bank 14 may have a USD-based BIN account with card association 34 and thereby receive USD from card association 34. In that case, issuing bank 14 would profit from any fees and proceeds of exchange rates involved in the currency conversion from USD to its native currency GBP.

Transaction processing center 30 has the ability to simplify, or at least shift the currency conversion procedure away from card association 34 and issuing bank 14, for the benefit of anyone partnering with transaction processing center 30, e.g. acquiring bank 24 and merchant 20. The selectable nature of clearing currency 124 provides the feature of converting transaction currency 122 to clearing currency 124 to match any other currency, including the native currency of issuing bank 14 which in most cases is the same as the billing currency of cardholder 12, prior to sending the transaction to card association 34. Transaction processing center 30 can establish multiple BINs with card association 34 for clearing currency 124, one for each currency to be used as clearing currency 124.

For transaction A, with the knowledge of the system settings of issuing bank 14 and cardholder 12, the purchase authorization request is converted from transaction currency 122 to clearing currency 124 which may be a different currency than transaction currency 122. That is, the purchase authorization request is converted from USD to GBP by transaction processing center 30 prior to transfer of the purchase authorization request to card association 34. Transaction processing center 30 selects the BIN associated with GBP when forwarding transaction A to card association 34. When the purchase authorization request is received by card association 34, the transaction will be viewed as a conventional transaction in the native currency of the BIN for issuing bank 14, i.e. in GBP, with no need for card association 34 to perform any currency conversion or access any fees or make any mark-up or mark-down associated with a currency conversion. Transaction processing center 30 may mark-up or mark-down or otherwise access a fee on the monetary value of the transaction for a currency conversion from transaction currency 122 to clearing currency 124 based on the system settings related to merchant 20, issuing bank 14, acquiring bank 24, and card association 34.

The currency conversion from transaction currency 122 to clearing currency 124 is performed by transaction processing center 30, which is acting on behalf of acquiring bank 24 and merchant 20, prior to the purchase authorization request being transferred to card association 34. Merchant 20 is a customer of acquiring bank 24. Although transaction processing center 30 may access fees and mark-ups or mark-downs in the monetary value of the transaction based on system settings, transaction processing center 30 and acquiring bank 24 will both have a vested interest in providing maximum overall value in the transaction for merchant 20. By knowing the mark-up and mark-down of issuing bank 14 from its settings, transaction processing center 30 can research the open financial markets for better rates and provide the best service to its customers, i.e. acquiring bank 24 and merchant 20.

Prior to transfer to card association 34, the purchase authorization request for transaction A exists in transaction processing center 30 in the form of clearing currency 124. Transaction processing center 30 will transfer the purchase authorization request to card association 34 with the amount of the transaction stated in clearing currency 124. The clearing currency 124 is selected to match the native currency of issuing bank 14 and/or the billing currency of cardholder 12. In the situation where the native currency of issuing bank 14 is different from the billing currency to cardholder 12, clearing currency 124 may be selected to match the billing currency to cardholder 12 to avoid additional fees for currency conversion to the cardholder by the issuing bank or card association. When card association 34 receives the transaction, the purchase will appear to be a conventional transaction in the native currency of issuing bank 14, or at least the same currency as defined for the BIN which issuing bank 14 uses to conduct transactions with card association 34.

For transaction A, clearing currency 124 is GBP. Card association 34 requests the purchase authorization request be approved by issuing bank 14 in GBP. Issuing bank 14 checks cardholder 12's credit card account based on the amount of the purchase authorization request in GBP. Issuing bank 14 approves or disapproves the purchase authorization request based on GBP and responds to card association 34. Card association 34 forwards the response to transaction processing center 30 with the approval or denial in settlement currency 126 as determined by the acquiring BIN used by transaction processing center 30 for the transaction. Settlement currency 126 is that currency which acquiring bank 24 wishes to receive from card association 34. Transaction processing center 30 can establish multiple BINs with card association 34 for settlement currency 126, one for each currency to be used as settlement currency 126. As a final step, transaction processing center 30 converts settlement currency 126 to merchant funding currency 128, if necessary. Merchant funding currency 128 is that currency in which merchant 20 wants to be paid. For transaction A, transaction processing center 30 has set settlement currency 126 and merchant funding currency 128 both to USDs at the request of and for the benefit of acquiring bank 24 and merchant 20. Therefore, there is no need for a currency conversion. Merchant 20 receives the approved or denial to the purchase authorization request in USD.

Assume the transaction between cardholder 12 and merchant 20 is approved and completed, the clearing and settlement of transaction A follows a similar path through the institutions. Request currency 120 for clearing and settlement is USD. Transaction currency 122 for clearing and settlement is USD. Transaction currency 122 is converted to GBP as clearing currency 124. The clearing and settlement transaction is sent to card association 34 in clearing currency 124, i.e. GBP. Card association 34 views the clearing and settlement as a transaction in issuing bank 14's native or BIN currency. There is no currency conversion, fees assessment, mark-up or mark-down by card association 34, even though cardholder 12 and merchant 20 are dealing in different currencies. Transaction processing center 30 has handled the currency conversion on behalf of merchant 20. Card association 34 sends the clearing currency to issuing bank 14. Issuing bank 14 makes a wire transfer or authorizes debit against its account at card association 34 in the currency defined by the BIN used by issuing bank 14. Card association 34 makes a wire transfer or credits the account of transaction processing center 30 as defined by its BIN. Transaction processing center 30 receives monies for settlement of transaction A in settlement currency 126, which is USD in the present example. Transaction processing center 30 converts the monies to merchant funding currency 128 if necessary and forwards the settlement to acquiring bank 24 to credit to merchant 20's account or directly to merchant 20. Since settlement currency 126 and merchant funding currency 128 are the same, no currency conversion is necessary.

Now consider a transaction B where cardholder 12 is making a purchase from merchant 20 over the internet. Merchant 20 operates a website where merchandise is offered at any currency rate as selected by the customer. The customer pulls down a selection box on the computer screen and receives a price quote in the selected request currency. In this example, cardholder 12 is a US citizen living in Japan and merchant 20 is French company. Acquiring bank 24 is a French national bank. Issuing bank 14 is a US national bank. Cardholder 12 pays US-based issuing bank 14 is USD. Cardholder 12 selects the price to be paid for the merchandise on merchant 20's website in Japanese Yen (JPY) to compare with local competitive pricing. Merchant 20 wants to be paid in Euro Dollars (EUR).

In FIG. 6, request currency 120 is JPY. Transaction currency 122 is EUR for the benefit of acquiring bank 24 and merchant 20. Transaction processing center 30 performs the currency conversion from request currency 120 in JPY to transaction currency 122 in EUR. Clearing currency 124 is selected to be USD so the transaction appears to be in the native currency of issuing bank 14 and cardholder 12. Transaction processing center 30 performs the currency conversion from transaction currency 122 in EUR to clearing currency 124 in USD. Card association 34 receives a transaction in USD as the clearing currency. Issuing bank 14 authorizes (or settles) the transaction in USD. Transaction processing center 30 elects to receive settlement currency 126 from card association 34 in USD so that there is no currency conversion done by card association 34. Transaction processing center 30 performs a currency conversion from settlement currency 126 in USD to merchant funding currency 128 in EUR.

Merchant 20 should not be assessed any currency conversion fees or mark-ups or mark-downs by card association 34 or issuing bank 14 because card association 34 and issuing bank 14 view the entire transaction as based in its native currency of USD with no currency conversion needed. Request currency 120, transaction currency 122, and clearing currency 124 allow transaction processing center 30 to control the currency conversion on the transaction on the front end of the process and extract the most favorable exchange rate from the financial markets. Settlement currency 126 and merchant funding currency 128 allows transaction processing center 30 to control the currency conversion on the transaction on the back end of the process and extract the most favorable exchange rate from the financial markets.

The BINs set up with card association 34 allow transaction processing center 30 to control the points in the transaction where currency conversion will occur. Transaction processing center 30 simply chooses the desired BIN in which to transfer the transaction. The currency conversion occurs by transaction processing center 30 placing a certain value of the transaction, taking into account foreign exchange rates, into the desired BIN. Transaction processing center 30 may mark-up or mark-down or otherwise access a fee on the monetary value of the transaction for any currency conversion described above based on the system settings. Merchant 20 is expecting to receive the monetary value of the transaction as quoted in request currency 120 in the form of merchant funding currency 128. As a result of the currency conversions by transaction processing center 30, if merchant 20 receives more than expected based on request currency 120, then merchant 20 benefited from the currency conversions in the transaction. If merchant 20 receives less than expected based on request currency 120, then merchant 20 will have paid a fee from the transaction. The currency conversion process in FIGS. 6 and 7 allows transaction processing center 30 to control the points where currency conversion is performed and how and to whom fees are accessed for the currency conversions.

Acquiring bank 24 and merchant 20 are no longer dependent on card association 34 for the clearing or settlement currency conversions. Instead, the conversion from transaction currency 122 to clearing currency 124 and the conversion from settlement currency 126 and merchant funding currency 128 can be managed and handled by transaction processing center 30 on behalf of merchant 20 and acquiring bank 24 and for the benefit of its partners.

Figure 7:
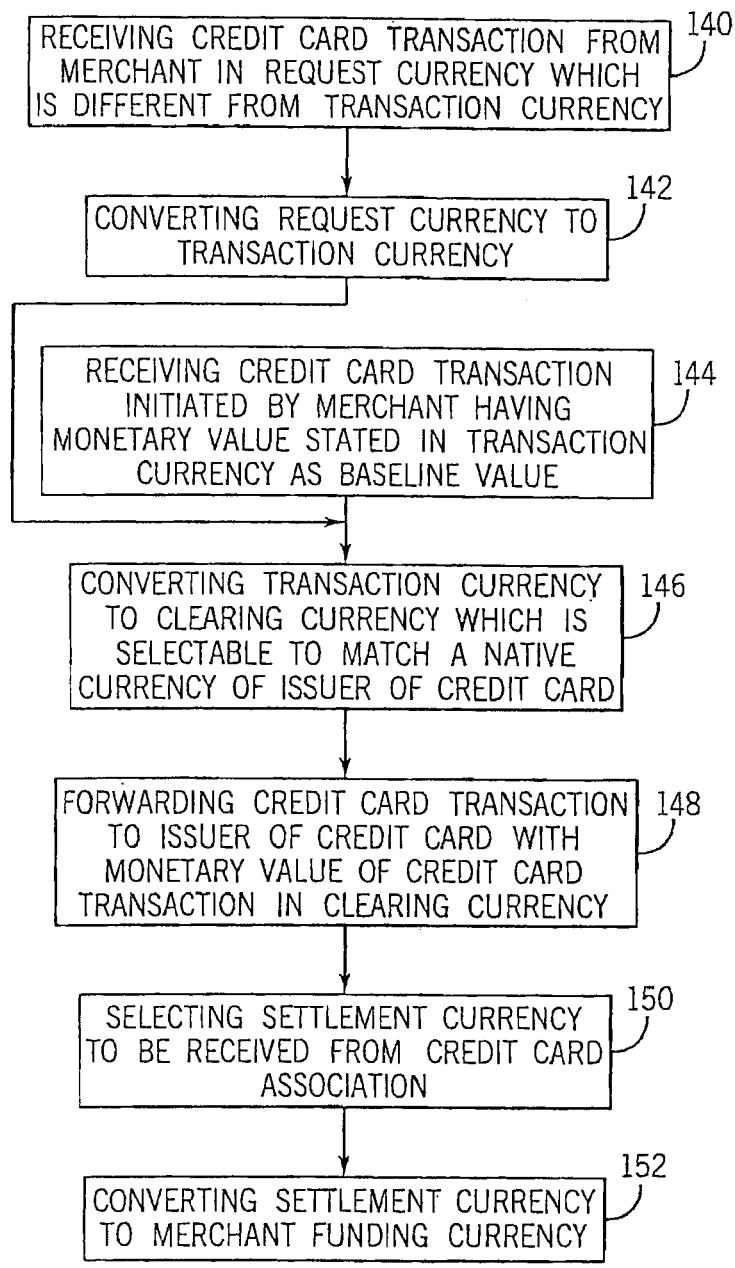
FIG. 7 is a flowchart of the operation of the currency conversions of FIG. 6.

FIG. 7 illustrates the steps involved in the operation of currency conversion process. Step 140 receives the credit card transaction from merchant 20 in request currency 120 which is different from transaction currency 122. Step 142 converts request currency 120 to transaction currency 122. Step 144 receives a credit card transaction initiated by merchant 20 having a monetary value stated in transaction currency 122 as a baseline value. Step 146 converts transaction currency 122 to clearing currency 124 which is selectable to match the native currency of issuing bank 14. Step 148 forwards the credit card transaction to card association 34 and issuing bank 14 with the monetary value of the credit card transaction in clearing currency 124. Step 150 selects settlement currency 126 to be received from card association 34. Step 152 converts settlement currency 126 to merchant funding currency 128.

An advantage of having the currency conversion process as shown in FIGS. 6 and 7 is maximum flexibility to configure transaction processing system 10 to operate in any manner as requested by acquiring bank 24, if transaction processing center 30 is working for the acquiring bank. The currency conversion can be performed by transaction processing center 30, as illustrated in transaction A, where transaction currency 122 in USD is converted to clearing currency 124 in GBP so that card association 34 received the transaction in the native currency of issuing bank 14. If acquiring bank 24 or merchant so chooses, the currency conversion can be left to card association 34 by leaving clearing currency 124 in USD. The same holds true for transaction B. On the settlement side of transaction B, the currency conversion from issuing bank 14 to the native currency of acquiring bank 24 can be handled by transaction processing center 30 by making clearing currency 124 and settlement currency 126 the same currency. Card association 34 would not perform any currency conversion. The currency conversion can be left to card association 34 by leaving settlement currency 124 the same as merchant funding currency 128. By selecting the currency conversion points 120-128, transaction processing center 30 can control the currency conversion process for the entire transaction.

Figure 8:
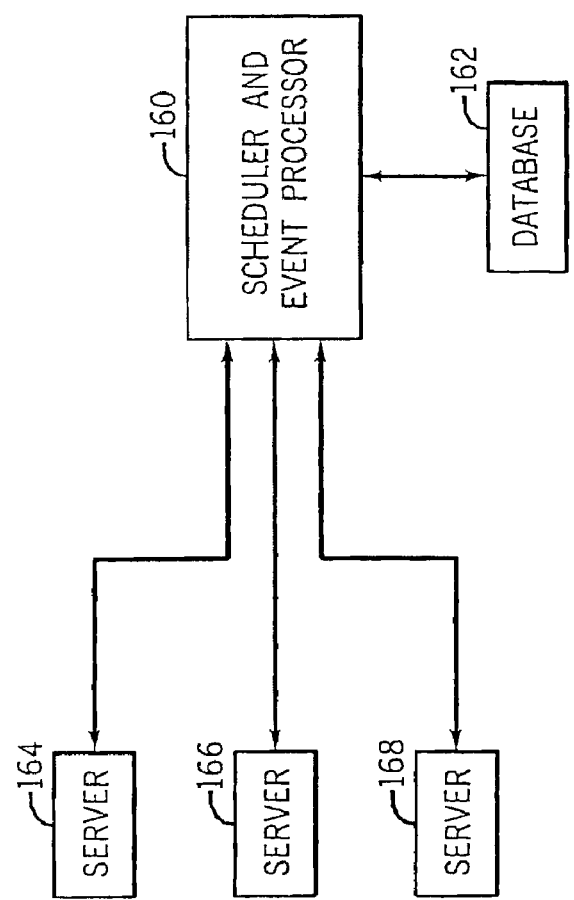
FIG. 8 is a block diagram of the scheduler and event processor for the transaction processing center.

To handle the large number and variety of transactions processing through transaction processing system 10, transaction processing center 30 includes a scheduler and event processor 160 as shown in FIG. 8. Scheduler 160 works in combination with data processing 82 in FIG. 4 to provide efficient utilization of the resources of transaction processing center 30. Scheduler 160 is a computer program or operating system executing on a server or a distributed computer system. The computer system running scheduler 160 includes one or more CPUs, electronic memory, hard disk drive, and interfaces to communicate with peripherals. Scheduler 160 uses database 162 residing on a hard disk drive. Database 162 is configurable with timing, instructions, and other information used by servers 164, 166, and 168 which run data processing 82. Database 162 includes information such as process identifier, execution interval, polling interval, concurrency requirements, dependencies, and error checks.

Scheduler 160 schedules various processes or client applications to run on servers 164-168 and keeps track of the individual runs or executions. Assume scheduler 160 is configured to run a clearing and settlement as a process every 60 minutes. Database 162 would have an entry for a process identifier, say process number 200, for the clearing and settlement process. The time interval is 60 minutes, although the time interval can be any length of time. The polling interval is set to 10 minutes. The clearing and settlement process would typically not have any concurrency requirements because more than one clearing and settlement process could potentially run at one time. The clearing and settlement process may have dependencies that would be recorded in the entry for process number 200 in database 162.

Server 164 is a computer system operating under the control of a CPU. Server 164 operates a computer program which is enabled or configured to run one or more predefined processes. When server 164 comes on-line, the software processes configured to run on server 164 each in turn query or check in with scheduler 160, identify the process (e.g. process number 200), and requests a task or assignment. A first process running on server 164 will query or check in with scheduler 160 and request a task according to its configuration. If there is such a task to be performed, scheduler 160 provides execution instructions to the first process. If there are no such tasks for the first process, scheduler 160 gives the first process its next time to check in. A second process configured to run on server 164 will check in with scheduler 160 and request a task according to its configuration. If there is such a task to be performed, scheduler 160 provides execution instructions to the second process. If there are no such tasks for the second process, scheduler 160 gives the second process its next time to check in.

Assume scheduler 160 gives the first process configured to run on server 164 the task of running the clearing and settlement process and schedules the execution time in 60 minutes. Scheduler 160 also informs server 164 that there are no concurrency requirements or no dependencies and that it should poll or check back with scheduler 160 every 10 minutes (poll interval) until execution time. The first process on server 164 keeps track of the time and polls scheduler 160 every 10 minutes to see if any instructions have changed. If the situation changes, such as an event on transaction processing center 30 or an update to database 162, then the first process on server 164 may receive revised instructions from scheduler 160 at one of the polling times.

At the appointed execution time, the first process on server 164 queries or checks in with scheduler 160 one last time before executing process number 200. If all is good to go, server 164 begins executing process number 200. Server 164 starts executing the clearing and settlement process by extracting one or more files from incoming queue 80 that have the file number associated with clearing and settlement. The file is parsed and the data is processed. During the execution of the clearing and settlement process, server 164 further records or logs in various information and events related to execution of the clearing and settlement process into database 162. For example, server 164 records the start time, completion time, and completion of various status check points during the execution of the clearing and settlement process into database 162. The status check points can be used for error correction and restart if the process does not complete successfully. When the clearing and settlement process is complete, then server 164 notifies scheduler 160 that the task is complete. Scheduler 160 then assigns server 164 its next task of another clearing and settlement process to be run in another 60 minutes with instructions to poll every 10 minutes.

In another embodiment, server 164 may contain a number of processes. Server 164 will check in with scheduler 160 and see want needs to be done and then activate the appropriate process. In addition to clearing and settlement, if server 164 were enabled to handle generating certain reports, say process number 300, then scheduler 160 would be able to give server 164 either process number 200 or process number 300 for its next assignment. Thus, when a process checks in for work, scheduler 160 will assign a task based on the abilities of the process and the priority of the work to be done.

Scheduler 160 tracks and handles concurrency constraints. Some processes can run concurrently and others cannot. If a process is concurrency constrained, i.e. it must execute by itself and finish before another like or related process can start, then scheduler 160 will hold off such like or related processes until the concurrency constrained process finishes. For example, a first account reconciliation may be concurrency constrained so that a second account reconciliation cannot run until the first account reconciliation is finished. Scheduler 160 may allow certain processes to operate concurrently. For example, first and second reports which are merely accessing data, possibly the same data, can be run simultaneously.

Scheduler 160 can also track and handle dependency constraints. Some processes may be required to wait until another process finishes. For example, the clearing and settlement process may have to wait until an audit is finished so the underlying data does not change during the audit. Alternately, an account reconciliation may have to wait for a clearing and settlement to run so that transaction processing center 30 has the latest data.

At times a process might fail to complete. Scheduler 160 waits to receive a report from server 164 that the assigned task was successfully completed. If there is a run problem, then server 164 will record and report the last known good check point or event. Scheduler 160 analyzes what has been done and what still needs to be done so the failed process can be restarted at the last known good check point without repeating unnecessary and duplicative steps in the process that might lead to other errors.

As the work load increases, scheduler 160 supports adding more process resources without the need to reconfigure transaction processing center 30. Server 166 is a computer system running a computer program under the control of a CPU. Server 168 is also a computer system running a computer program under the control of a CPU. Servers 164, 166, and 168 may be local or remote servers in a distributed system. Servers 164-168 are configured to run one or more processes on transaction processing center 30. Server 164 may be configured to execute a first type of process such as clearing and settlement. Server 166 may be configured to execute the first type of process and/or a second type of process such as a report. Server 168 may be configured to execute yet another type of process.

Assume server 166 comes on-line with a configuration that handles process number 200 and process number 300. Further assume server 168 comes on-line with a configuration that handles only process number 300. Servers 166 and 168 communicate with scheduler 160. Scheduler 160 looks in database 162 to see what are the next priority processes for which servers 166 and 168 are configured to run. Tasks are assigned to processes on servers 166 and 168 accordingly with the associated execution time and polling interval.

Assume that at time $t_0$ server 164 queries or checks in with scheduler 160 and is assigned process number 200 in 60 minutes, e.g. 8 pm. At time $t_0+5$ minutes, server 166 queries or checks in with scheduler 160 and is assigned the next process number 200 at 9 pm. At time $t_0+10$ minutes, server 168 queries or checks in with scheduler 160 and is assigned process number 300. At 8 pm, server 164 queries scheduler 160, receives final okay to run, executes the assigned process and completes at 8:20 pm. Server 164 checks in with scheduler 160 to let it know that the process number 200 at 8 pm was successfully completed and that server 164 is ready for the next task. Scheduler 160 has already assigned the 9 pm time slot for clearing and settlement to server 166. However, there are a number of reports pending on transaction processing center 30. Scheduler 160 assigns server 164 to execute a process number 300 to run at 8:30 pm in order to get a few reports done since the clearing and settlement is in taken care of for time being.

Since scheduler 160 hands out tasks as each server 164-168 checks in, there is no need to reconfigure database 162. When server 164 is operating by itself, it had 100% of the work load. When server 166 comes on-line, it shares the load equally with server 164. The configured processes on servers 164 and 166 have the same capability and, on the average, scheduler 160 will use each the same as they query for tasks. When server 168 comes on-line, it will share the load as well but may be not equally with servers 164 and 16.6 because server 168 can only do reports. Nonetheless, the processing capacity of transaction processing center 30 is scalable by adding new process resources and servers. Each new process shares the work load depending on the tasks to be preformed and the capabilities of the processes. Again, there is no need to reconfigure database 162 with each new process added to transaction processing center 30 because scheduler 160 uses the resources on hand and distributes the work according to its capability as each process checks in.

Figure 9:
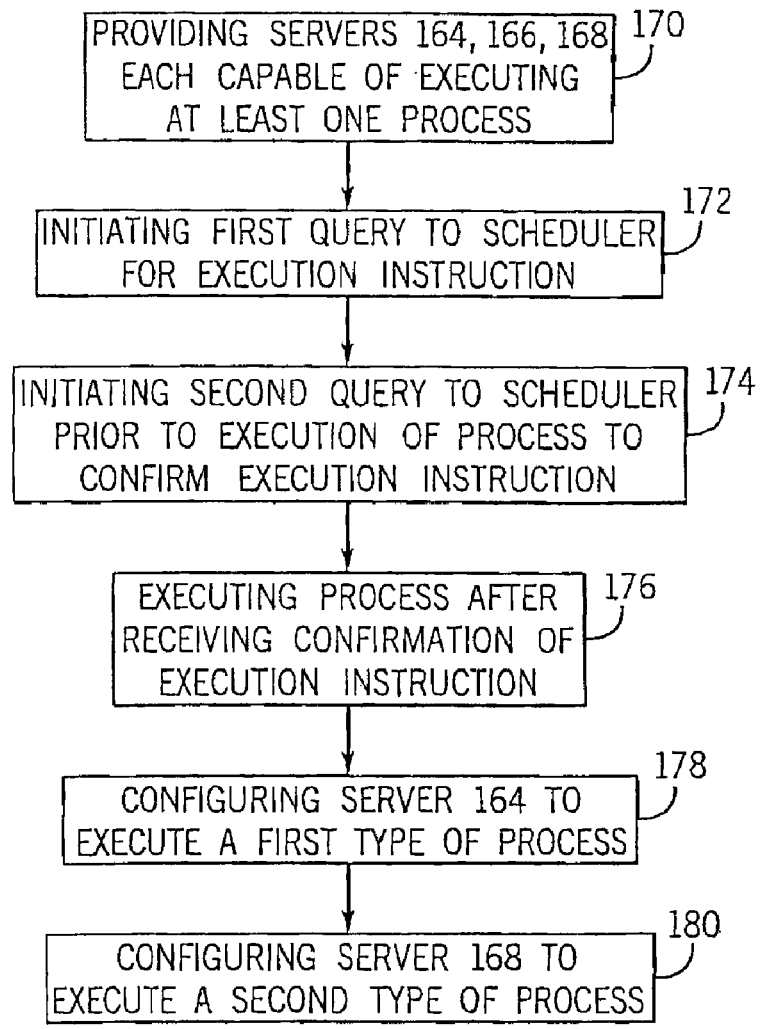
FIG. 9 is a flowchart of the operation of the scheduler and event processor.

FIG. 9 illustrates the steps involved in the operation of scheduler 160. Step 170 provides servers 164, 166, and 168 each having one or more configured processes. Step 172 initiates first query to scheduler 160 for an execution instruction. Step 174 initiates second query to scheduler 160 prior to execution of the process to confirm the execution instruction. Step 176 executes the process after receiving confirmation of the execution instruction. Step 178 configures server 164 to execute a first type of process. Step 180 configures server 168 to execute a second type of process.

Although the present invention has been described with respect to preferred embodiments, any person skilled in the art will recognize that changes be made in form and detail, and equivalents may be substituted for elements of the invention without departing from the spirit and scope of the invention. Many modifications may be made to adapt to a particular situation or material to the teaching of the invention without departing from the essential scope of the invention. Therefore, it is intended that the invention not be limited to the particular embodiments disclosed for carrying out this invention, but that the invention will include all embodiments falling within the scope of the appended claims.

What is claimed is:

1. A system for processing financial transactions between first and second parties, comprising:
    a first financial institution having an electronic communication link for providing access to a credit instrument for the first party;
    a second financial institution having an electronic communication link for acquiring transactions from the second party;
    an association having an electronic communication link to the first financial institution for providing data processing services; and
    a transaction processing center operating with electronic communication links between the second financial institution and the association, wherein the transaction processing center includes:
        (a) a data separation processor receiving and separating the transactions into high-throughput purchase transactions and low-throughput batch transactions, the data separation processor separating the high-throughput purchase transactions from the low-throughput batch transactions by message content or file attribute associated with the high-throughput purchase transactions and the low-throughput batch transactions, the data separation processor further formatting the high-throughput purchase transactions and the low-throughput batch transactions for transmission through the transaction processing center,
        (b) a first data processing channel coupled to a first output of the data separation processor and dedicated to transmitting the high-throughput purchase transactions within the system, the first data processing channel being continuously open and active for high-throughput processing, and
        (c) a second data processing channel, separate from the first data processing channel, coupled to a second output of the data separation processor and dedicated to transmitting the low-throughput batch transactions within the system with a lower system priority than the high-throughput purchase transactions, the second data processing channel including an incoming queue for receiving the low-throughput batch transactions, a data processor for reading the low-throughput batch transactions from the incoming queue and placing the low-throughput batch transactions in local storage, and an outgoing queue for receiving the low-throughput batch transactions from the local storage and transmitting the low-throughput batch transactions through the second output of the data separation processor.

2. The system of claim 1 further including a data storage device for storing the high-throughput purchase transactions and the low-throughput batch transactions.

3. The system of claim 2 wherein one of the high-throughput purchase transactions is an authorization request.

4. The system of claim 3 wherein the first data processing channel includes:
    a first authorization process receiving the authorization request and routing the processed authorization request to the data storage device; and
    a second authorization process receiving the processed authorization request from the data storage device and routing the processed authorization request to an output of the system.

5. The system of claim 2 wherein one of the low-throughput batch transactions is a clearing and settlement transaction.

6. The system of claim 5 wherein the second data processing channel includes:
    a clearing process receiving the clearing and settlement transaction and routing the processed clearing and settlement transaction to the data storage device; and
    a settlement process receiving the processed clearing and settlement transaction from the data storage device and routing the processed clearing and settlement transaction to an output of the system.

7. A credit card processing system, comprising a data processing center having a communication link with a merchant to receive credit card transactions initiated by the merchant, wherein the data processing center includes:
  (a) a data separation processor receiving and separating the credit card transactions into high-throughput purchase transactions and low-throughput batch transactions by message content or file attribute associated with the high-throughput purchase transactions and the low-throughput batch transactions;
  (b) a first data processing channel coupled to a first output of the data separation processor for transmitting the high-throughput purchase transactions within the credit card processing system, the first data processing channel being continuously open and active for high-throughput processing; and
  (c) a second data processing channel, separate from the first data processing channel, coupled to a second output of the data separation processor for transmitting the low-throughput batch transactions within the system with a lower system priority than the high-throughput purchase transactions, the second data processing channel including an incoming queue for receiving the low-throughput batch transactions, a data processor for reading the low-throughput batch transactions from the incoming queue and placing the low-throughput batch transactions in local storage, and an outgoing queue for receiving the low-throughput batch transactions from the local storage and transmitting the low-throughput batch transactions through the second output of the data separation processor.

8. The credit card processing system of claim 7 further including a data storage device for storing the high-throughput purchase transactions and the low-throughput batch transactions.

9. The credit card processing system of claim 8 wherein one of the high-throughput purchase transactions is an authorization request.

10. The credit card processing system of claim 9 wherein the first data processing channel includes:
  a first authorization process receiving the authorization request and routing the processed authorization request to the data storage device; and
  a second authorization process receiving the processed authorization request from the data storage device and routing the processed authorization request to an output of the system.

11. The credit card processing system of claim 8 wherein one of the low-throughput batch transactions is a clearing and settlement transaction.

12. The credit card processing system of claim 11 wherein the second data processing channel includes:
  a clearing process receiving the clearing and settlement transaction and routing the processed clearing and settlement transaction to the data storage device; and
  a settlement process receiving the processed clearing and settlement transaction from the data storage device and routing the processed clearing and settlement transaction to an output of the system.

13. A method of processing a data transaction, comprising:
  receiving high-throughput transactions and low-throughput transactions;
  selectively routing the high-throughput transactions through a first data processing channel by analyzing message content or file attribute associated with the high-throughput purchase transactions, the first data processing channel being continuously open and active for high-throughput processing;
  selectively routing the low-throughput transactions through a second data processing channel with a lower priority than the high-throughput transaction by analyzing message content or file attribute associated with the low-throughput purchase transactions, the second data processing channel being separate from the first data processing channel; and
  locally storing the low-throughput transactions in a data storage device within the second data processing channel.

14. The method of claim 13 wherein one of the high-throughput transactions is an authorization request.

15. The method of claim 14 wherein the step of providing a first data processing channel includes:
  providing a first authorization process for receiving the authorization request and routing the processed authorization request to the data storage device; and
  providing a second authorization process for receiving the processed authorization request from the data storage device and routing the processed authorization request to an output of the system.

16. The method of claim 13 wherein one of the low-throughput transactions is a clearing and settlement transaction.

17. The method of claim 16 wherein the step of providing a second data processing channel includes:
  providing a clearing process for receiving the clearing and settlement transaction and routing the processed clearing and settlement transaction to the data storage device; and
  providing a settlement process for receiving the processed clearing and settlement transaction from the data storage device and routing the processed clearing and settlement transaction to an output of the system.

18. The method of claim 13 wherein the data transaction is a credit card transaction.

* * * * *